(12) United States Patent
Edwards et al.

(10) Patent No.: US 12,051,260 B2
(45) Date of Patent: Jul. 30, 2024

(54) DOCUMENT ANALYSIS TO IDENTIFY DOCUMENT CHARACTERISTICS AND APPENDING THE DOCUMENT CHARACTERISTICS TO A RECORD

(71) Applicant: Capital One Services, LLC, McLean, VA (US)

(72) Inventors: Joshua Edwards, Philadelphia, PA (US); Abdelkader M'hamed Benkreira, Brooklyn, NY (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 422 days.

(21) Appl. No.: 17/445,442

(22) Filed: Aug. 19, 2021

(65) Prior Publication Data
US 2023/0056653 A1    Feb. 23, 2023

(51) Int. Cl.
| | |
|---|---|
| G06V 30/418 | (2022.01) |
| G06F 40/279 | (2020.01) |
| G06Q 20/14 | (2012.01) |
| G06Q 20/38 | (2012.01) |
| G06Q 40/02 | (2023.01) |
| G06V 30/19 | (2022.01) |
| G06V 30/262 | (2022.01) |
| G06V 30/416 | (2022.01) |

(52) U.S. Cl.
CPC ......... *G06V 30/418* (2022.01); *G06F 40/279* (2020.01); *G06Q 20/14* (2013.01); *G06Q 20/389* (2013.01); *G06Q 40/02* (2013.01); *G06V 30/262* (2022.01); *G06V 30/416* (2022.01); *G06V 30/19007* (2022.01)

(58) Field of Classification Search
None
See application file for complete search history.

(56) References Cited

U.S. PATENT DOCUMENTS

| | | |
|---|---|---|
| 8,798,354 B1 | 8/2014 | Bunzel et al. |
| 10,572,727 B1 * | 2/2020 | Sachtleben .......... G06V 30/413 |
| 11,087,409 B1 * | 8/2021 | Bobley ............ G06Q 10/06395 |
| 11,100,478 B2 * | 8/2021 | Hsieh ................... G06Q 20/102 |

(Continued)

*Primary Examiner* — Vu Le
*Assistant Examiner* — Charles C L Penny
(74) *Attorney, Agent, or Firm* — Harrity & Harrity, LLP

(57) ABSTRACT

In some implementations, a device may receive a document associated with a series of recurring events and associated with an account. The device may analyze, using at least one of an optical character recognition technique or a natural language processing technique, the document to identify one or more characteristics associated with the document. The device may match the document with a record included in a ledger associated with the account based on the one or more characteristics associated with the document, enabling the device to identify that the record is associated with a recurring event of the series of recurring events. The device may modify display information associated with the ledger to append at least one characteristic associated with the document to information associated with the record. The device may transmit, to a user device, the display information to cause the display information to be displayed by the user device.

20 Claims, 7 Drawing Sheets

(56) References Cited

U.S. PATENT DOCUMENTS

| | | | |
|---|---|---|---|
| 2005/0160038 A1* | 7/2005 | Albornoz | G06Q 20/108 |
| | | | 705/42 |
| 2016/0042469 A1* | 2/2016 | Lochrie | G06F 16/285 |
| | | | 705/30 |
| 2016/0117650 A1* | 4/2016 | Weidenmiller | G06Q 20/405 |
| | | | 705/44 |
| 2021/0027394 A1* | 1/2021 | Yee | G06Q 40/02 |
| 2022/0366488 A1* | 11/2022 | Jordan | G06Q 40/02 |

\* cited by examiner

400

410 — Receive an indication of a contract associated with a series of recurring events, wherein the contract is associated with an account 420 — Identify one or more characteristics associated with the contract, wherein the one or more characteristics include at least one of an entity associated with the contract or a charge associated with the series of recurring events 430 — Match the contract with a record included in a ledger associated with the account based on the one or more characteristics associated with the contract, wherein matching the contract with the record enables the device to identify that the record is associated with a recurring event of the series of recurring events 440 — Append at least one characteristic, of the one or more characteristics, associated with the contract to information associated with the record in display information associated with the ledger 450 — Provide, to a user device, the display information to cause the display information to be displayed by the device, wherein the display information includes the information associated with the record linked with the at least one characteristic

FIG. 4

DOCUMENT ANALYSIS TO IDENTIFY DOCUMENT CHARACTERISTICS AND APPENDING THE DOCUMENT CHARACTERISTICS TO A RECORD

BACKGROUND

Document analysis techniques may include optical character recognition (OCR) techniques, natural language processing (NLP) techniques, computer vision techniques, and/or other image processing techniques. For example, OCR techniques may be used in computing environments to identify text within an image and extract the text in a manner designed to enable the identified text to be read by a human and/or handled by a computer. Digital documents may be stored on a device as an image, rather than machine-encoded text. OCR, NLP, computer vision, and/or other techniques can be used by the device to identify text included in the digital documents so that the digital documents can be electronically processed by the device.

SUMMARY

Some implementations described herein relate to a system for document analysis to identify document characteristics. The system may include one or more memories and one or more processors coupled to the one or more memories. The one or more processors may be configured to receive a document associated with a series of recurring events, wherein the document is associated with an account that is registered to the system. The one or more processors may be configured to analyze, using at least one of an optical character recognition technique or a natural language processing technique, the document to identify one or more characteristics associated with the document, wherein the one or more characteristics include at least one of an entity associated with the document or an amount associated with the series of recurring events. The one or more processors may be configured to match the document with a record included in a ledger associated with the account based on the one or more characteristics associated with the document, wherein matching the document with the record enables the system to identify that the record is associated with a recurring event of the series of recurring events. The one or more processors may be configured to modify display information associated with the ledger based on matching the document with the record, wherein modifying the display information includes appending at least one characteristic, of the one or more characteristics, associated with the document to information associated with the record in the display information. The one or more processors may be configured to transmit, to a device, the display information to cause the display information to be displayed by the device.

Some implementations described herein relate to a method of document analysis to identify document characteristics. The method may include receiving, by a device, an indication of a contract associated with a series of recurring events, wherein the contract is associated with an account. The method may include identifying, by the device, one or more characteristics associated with the contract, wherein the one or more characteristics include at least one of an entity associated with the contract or an amount associated with the series of recurring events. The method may include matching, by the device, the contract with a record included in a ledger associated with the account based on the one or more characteristics associated with the contract, wherein matching the contract with the record enables the device to identify that the record is associated with a recurring event of the series of recurring events. The method may include appending, by the device, at least one characteristic, of the one or more characteristics, associated with the contract to information associated with the record in display information associated with the ledger. The method may include providing, by the device and to a user device, the display information to cause the display information to be displayed by the device, wherein the display information includes the information associated with the record linked with the at least one characteristic.

Some implementations described herein relate to a non-transitory computer-readable medium that stores a set of instructions for a device. The set of instructions, when executed by one or more processors of the device, may cause the device to receive a document associated with a series of recurring events, wherein the document is associated with an account that is registered to the device. The set of instructions, when executed by one or more processors of the device, may cause the device to analyze, using a text recognition technique, the document to identify one or more terms associated with the document, wherein the one or more terms include at least one of an entity associated with the document or an amount associated with the series of recurring events. The set of instructions, when executed by one or more processors of the device, may cause the device to match the document with a record included in a ledger associated with the account based on the one or more terms associated with the document, wherein matching the document with the record enables the device to identify that the record is associated with a recurring event of the series of recurring events. The set of instructions, when executed by one or more processors of the device, may cause the device to modify display information associated with the ledger based on matching the document with the record, wherein modifying the display information includes appending at least one term, of the one or more terms, associated with the document to information associated with the record in the display information. The set of instructions, when executed by one or more processors of the device, may cause the device to transmit, to a user device, the display information to cause the display information to be displayed by the user device.

BRIEF DESCRIPTION OF THE DRAWINGS

FIG. 4 is a flowchart of an example process relating to document analysis to identify document characteristics and appending the document characteristics to a record.

DETAILED DESCRIPTION

Figure 1A:
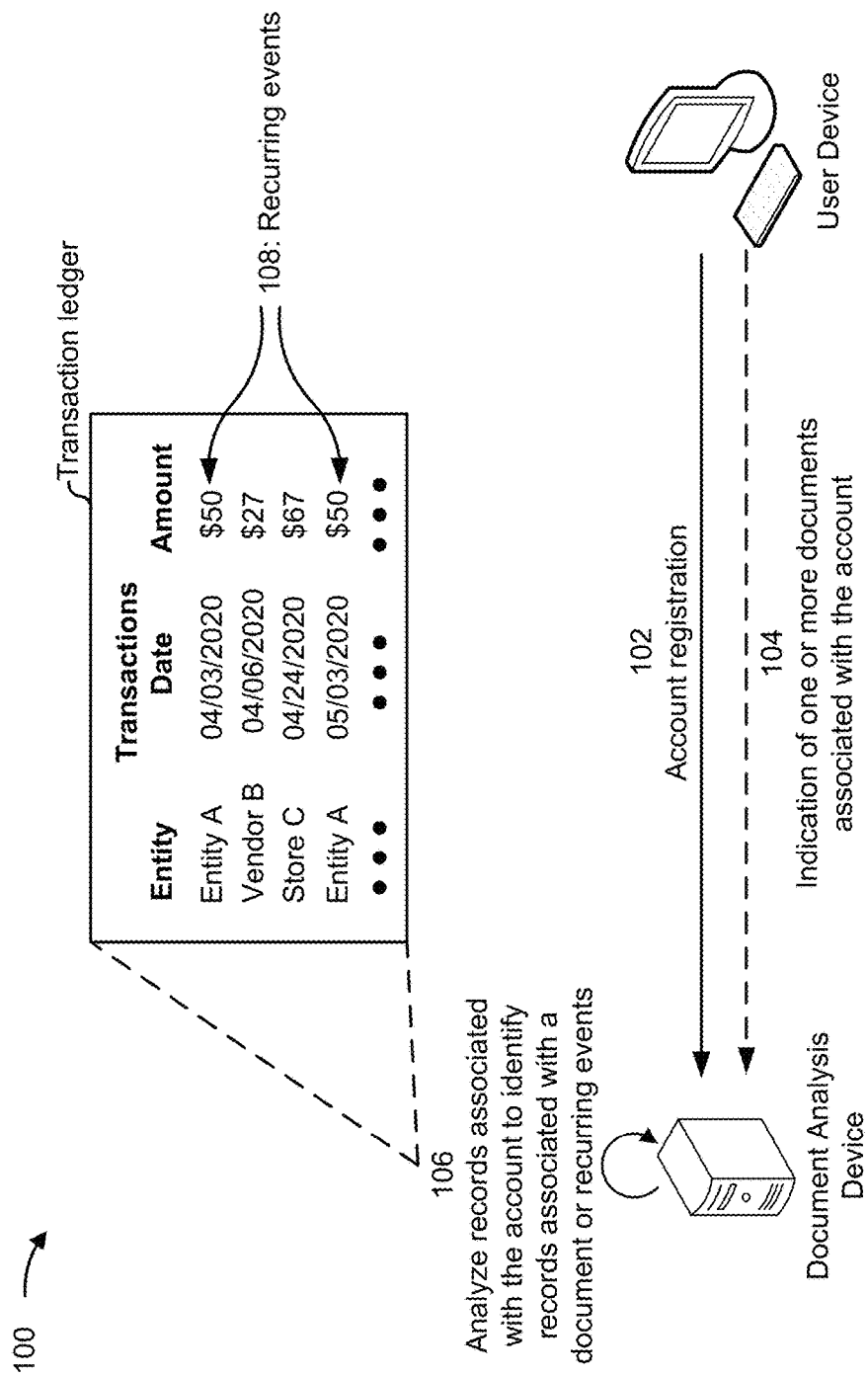
FIGS. 1A-1D are diagrams of an example implementation relating to document analysis to identify document characteristics and appending the document characteristics to a record.

The following detailed description of example implementations refers to the accompanying drawings. The same reference numbers in different drawings may identify the same or similar elements.

Various applications may utilize records and/or a record log (e.g., a collection of records) to manage and/or provide information associated with the records. For example, a record log may maintain records associated with events and/or actions involving an account associated with the record log. Further, a user may register an account with an application that is configured to maintain a record log for the user. For example, the user may access the record log to review information associated with the events and/or actions in the record. As a more specific example, a banking application may utilize a record log to maintain records of transactions (e.g., credits and/or debits of the account) involving an account registered to a user (e.g., a transaction account holder) of a banking institution or other type of financial institution. In such an example, the user, via the banking application, may review record logs corresponding to financial statements and/or transaction account activity. For example, the user may monitor balances and/or cash flow based on transactions performed using the account and/or may review the account for fraudulent activity, such as unauthorized use of the transaction account for a transaction.

A record of a record log may be generated for a transaction via a system, which is remote from a transaction terminal and/or a transaction device (e.g., a user device and/or a transaction card) that was used to engage in the transaction (e.g., the system may not be associated with and/or may not have access to data stored by the transaction terminal and/or the transaction device). Although the system may identify certain metadata associated with the transaction and/or may generate corresponding record metadata for a record, this metadata is typically limited to a time (or date) of the transaction, a location of the transaction, an amount of the transaction, and/or an entity (e.g., a merchant and/or vendor) associated with the transaction. Typically, this metadata is received in connection with the transaction as transaction data that is received from a transaction terminal used to facilitate the transaction.

However, in some cases, a transaction and/or a record may be associated with additional information that is relevant to the user. For example, a record may be associated with a series of recurring events (e.g., payments of a bill on a regular basis). The series of recurring events may be associated with a document (e.g., a contract or other document outlining the terms of the series of recurring events) that identifies one or more terms and/or one or more parameters associated with the series of recurring events. For example, a record may be associated with a recurring bill. A document associated with the bill may indicate an amount of time for which the document is valid (e.g., an amount of time associated with a contract), a termination date of the document, a payment due date, a payment amount, and/or other information associated with the recurring bill.

However, the system that manages and/or provides information associated with the records may not have access to such documents. For example, such documents may be locally stored by a user device and/or a device associated with the entity that provides the document (e.g., in a server device or a cloud server). Moreover, when a transaction is completed, the system may not receive an indication that the transaction is associated with recurring transactions and/or an indication that the transaction is associated with a contract or other document. Therefore, the system may be unable to access and/or identify information associated with the document to provide the information for display as contextual information (e.g., as metadata) associated with a record.

Some implementations described herein enable a device (e.g., a document analysis device) to analyze a document to identify one or more document characteristics associated with the document. The document may be associated with a series of recurring events (e.g., the document may define terms and/or parameters for a series of recurring transactions or other account events). In some implementations, the device may analyze the document using one or more text recognition techniques, such as an optical character recognition (OCR) technique, a natural language processing (NLP) technique, and/or a computer vision technique, to identify the one or more document characteristics. For example, the device may perform OCR and/or a computer vision technique on a portion of image data of the document to obtain recognized text. In some implementations, the device may use a trained OCR model or a trained computer vision model based on text of interest, e.g., in a situation where the text of interest is a payment due date, the device may use an OCR model that has been trained to accurately identify payment due dates from image data. The device may use NLP to process and/or analyze the obtained recognized text to identify the one or more document characteristics.

In some implementations, the device may receive the document associated with the series of recurring events. For example, the device may receive image data associated with the document (e.g., an image of a form, an image of a word processing document, a portable document format (PDF) image, and/or a screen capture of a web page). In some implementations, the device may receive the document from a user device (e.g., associated with a user who is associated with the document). In some implementations, the device may identify that a record is associated with a document. For example, the device may analyze the record (and/or a record log associated with the record) to identify that the record is associated with a series of recurring events. In some implementations, the device may use a machine learning model to identify that the record and/or the series of recurring events are associated with a document or a contract. In some implementations, based on identifying that the record and/or the series of recurring events are associated with a document or a contract, the device may request, from a user device or from a device associated with another entity, image data associated with the document or the contract. In some implementations, the device may automatically obtain (e.g., from a data store associated with the device) the document and/or document characteristics associated with the document based on identifying that the record and/or the series of recurring events are associated with the document.

The device may match one or more records to the document based on the one or more document characteristics. For example, the device may identify records in a record log (e.g., in a ledger) associated with a user that are associated with the analyzed document or contract. Matching the document with a record may enable the device to identify that the record is associated with a recurring event of the series of recurring events. In some implementations, the device may match the document with a record based on an account associated with the record, an entity (e.g., a vendor or a merchant) associated with the record, a payment amount associated with the record, a start date associated with the series of recurring events (e.g., a date of a first record in time associated with the record), and/or a payment date associated with the record, among other examples.

The device may generate display information associated with the record. The display information may include metadata associated with the record and an indication of at least one document characteristic associated with the document. For example, based on matching a record to the document, the device may generate display information to include metadata associated with the record (e.g., a time (or date) of the record, a location of the record, an amount of the record, and/or an entity (e.g., a merchant and/or vendor) associated with the record) and to include an indication of at least one document characteristic associated with the document. The device may transmit (e.g., to a user device) the display information to cause the user device to display (e.g., via a user interface of the user device) the display information.

Accordingly, the device may append contextual information associated with a document, captured separately from an execution of a transaction, to be proactively displayed, via a device, in association with a record when a user is accessing and/or interacting with a ledger. As a result, the device may conserve resources (e.g., computing resources and/or network resources) that would have otherwise been used associated with obtaining documents, obtaining document characteristics associated with the documents, obtaining information to match a document with a record in a ledger, and/or processing the documents and/or the document characteristics to verify that the document is associated with the user, among other examples. Additionally, some implementations described herein enable the device to provide additional context for a transaction that involved a document (e.g., a contract), thereby increasing the availability of providing context for a transaction.

In some implementations, the device may perform one or more other actions based on matching a record to a document. For example, a document characteristic may include one or more dates associated with the document (e.g., a termination date, a date associated with a change in an availability or a type of service provided under the document, and/or a date associated with a change in a payment amount). The device may detect a trigger event (e.g., associated with an occurrence of the date or is associated with a current date being within a threshold amount of time from the date) associated with a date of the one or more dates. The device may transmit, to a user device, a notification indicating at least one of the document, the entity associated with the document, the date, and/or a purpose (e.g., a significance of the date or an event that will occur on the date) associated with the date, among other examples. In some implementations, the device may automatically adjust account information (e.g., a budget associated with an account and/or a resource allocation associated with the account) based on detecting the trigger event. This enables an action to be performed (e.g., by the device and/or by the user device) based on the date associated with the document.

FIGS. 1A-1D are diagrams of an example 100 associated with document analysis to identify document characteristics and appending the document characteristics to a record. As shown in FIGS. 1A-1D, example 100 includes a document analysis device, a user device, an entity device, and/or a document database. These devices are described in more detail in connection with FIGS. 2 and 3. Although example 100 is described in connection with a transaction account and/or records associated with transactions, other examples are possible, such as examples associated with managing records of an event management account (e.g., a calendar or a schedule), an action management account (e.g., for managing a project and/or household), or any other suitable account that can be managed by a similar device as the document analysis device described herein (or a account that may include records associated with a document or a contract).

As shown in FIG. 1A, and by reference number 102, the user device may transmit, and the document analysis device may receive, an account registration associated with an account. The account may be associated with a user of the user device. In some implementations, the account may be a transaction account or another account associated with an institution (e.g., a financial institution or another institution) that manages and/or is associated with the document analysis device. In some implementations, the account registration may be a registration for an application or a service (provided by the document analysis device and/or the institution) for providing document characteristics appended to records of a ledger (e.g., a record log) associated with the account. "Document" may include a contract, a memorandum, a form, an invoice, and/or any document outlining and/or defining document characteristics associated with a series of recurring events. "Document characteristics" may include one or more terms and/or one or more parameters associated with the series of recurring events. For example, document characteristics may include an entity associated with the document, an amount (e.g., a charge or a payment amount) associated with the series of recurring events, an amount of time associated with the series of recurring events, a remaining amount of time associated with the series of recurring events, a termination date associated with the series of recurring events, a payment due date associated with the series of recurring events, and/or one or more dates associated with a change in terms or available features or services provided under the document, among other examples.

In some implementations, the account registration may indicate one or more permissions enabling the document analysis device to access documents (e.g., contracts or other documents) associated with the account and/or the user. For example, the account registration may provide permission for the document analysis device to access documents (e.g., provided via image data or other data) associated with the account and/or the user. In some implementations, the account registration may provide permission for the document analysis device to access documents stored by another device, such as the entity device or another device associated with an entity that provides and/or manages the document. For example, the account registration may provide a security key, or another unique identifier, that, when provided by the document analysis device, enables the document analysis device to access documents stored by another device.

In some implementations, the account registration may indicate one or more settings associated with the application or the service (provided by the document analysis device and/or the institution) for providing document characteristics appended to records of a ledger. For example, the account registration may indicate document characteristics to be displayed with records of the ledger. For example, the account registration may indicate that the document analysis device is to cause a payment due date associated with the document, a termination date associated with the document, and/or a payment amount associated with the document, among other examples, to be displayed with records (associated with the document) of the ledger. In some implementations, the account registration may indicate whether the document analysis device is to transmit notifications or alerts (e.g., associated with dates and/or upcoming payments associated with the document), as described in more detail herein (e.g., the account registration may include an opt-in to notifications and/or alerts). In some implementations, the account registration may indicate permissible actions that can be performed by the document analysis device associated with the account, as described in more detail herein (e.g., the account registration may include an opt-in to automatic actions to be performed by the document analysis device, or another device, based on dates and/or upcoming payments associated with the document).

In some implementations, as shown by reference number 104, the user device may transmit, and the document analysis device may receive, an indication of one or more documents associated with the account. In some implementations, the user device may transmit an image of the document or a file associated with the document. For example, the user device may transmit image data associated with a document. The image data may include an image of a form, an image of a word processing document, a PDF image, and/or a screen capture of a web page. In some implementations, the user device may transmit, and the document analysis device may receive, a PDF file, a word processing file, and/or another file associated with the document. In some implementations, the user device may transmit the image data and/or the file via an application executing on the user device, via a webpage, via an email service, and/or via messaging service, among other examples.

In some implementations, as shown by reference number 106, the document analysis device may analyze records (e.g., transaction records) associated with the account to identify records associated with a document and/or associated with a series of recurring events. For example, the account may be associated with a ledger (e.g., a transaction ledger) or a log that includes records associated with the account. The records may include information associated with different events associated with the account. "Events" may include transactions, payments, charges, scheduled events, and/or other account events associated with the account. For example, as shown in FIG. 1A, the ledger may include an indication of a set of transactions associated with the account. The records may indicate metadata associated with the transactions. For example, the metadata indicated by the records may be information provided by a transaction terminal or a transaction backend device (not shown in FIG. 1A) associated with the transaction, such as a time (or date) of the transaction, a location of the transaction, an amount of the transaction, and/or an entity (e.g., a merchant and/or vendor) associated with the transaction, among other examples. For example, as shown in FIG. 1A, a first record may indicate that a transaction is associated with "Entity A" (e.g., the entity associated with the transaction), a date of "04/03/2020" (e.g., a date associated with the transaction), and an amount of "$50" (e.g., an amount of the transaction). A second record may indicate that a transaction is associated with "Vendor B" (e.g., the entity associated with the transaction), a date of "04/06/2020" (e.g., a date associated with the transaction), and an amount of "$27" (e.g., an amount of the transaction).

The document analysis device may analyze the records included in the ledger to identify one or more records associated with a document (e.g., a contract or another document) and/or associated with a series of recurring events. For example, a recurring event may be an event that occurs on a recurring basis (e.g., daily, weekly, monthly, semiannually, or annually, among other examples). Recurring events may often be associated with a document and/or a contract. For example, recurring events may be associated with a series of recurring transaction events (e.g., payments of a bill on a regular basis). Typically, the terms and/or parameters (e.g., document characteristics) of such recurring transaction events are defined by a document. Therefore, the document analysis device may identify one or more records associated a series of recurring events to identify that the records included in the series of recurring events may be associated with a document.

For example, as shown by reference number 108, the ledger may include a set of records (or entries) associated with a series of recurring events that are associated with the account. The first set of entries indicate that the first series of recurring events were associated with amounts of $50 and occurred monthly on the third of the month (e.g., on 04/03/2020 and on 05/03/2020). In some implementations, the document analysis device may determine that the records are associated with a series of recurring events based on the amount, entity, and/or time associated with the transaction, among other examples, being approximately the same. Additionally, or alternatively, the document analysis device may determine that the records are associated with a series of recurring events based on the date associated with the records being associated with a periodic schedule (e.g., weekly, monthly, semi-annually, and/or annually).

In some implementations, the document analysis device may train a machine learning model (e.g., a machine learning technique) to identify recurring events (e.g., based on historical data). In some implementations, the document analysis device may train the machine learning model based on information included in the one or more entries or records (e.g., that are respectively associated with one or more events) of the historical data and/or additional information, such as indications of sets of entries, of the one or more entries, that are respectively associated with series of recurring events; statistical information associated with the series of recurring events (e.g., an average time between events included in a series of recurring events, a standard deviation determined for times between events included in a series of recurring events, an average transaction amount associated with a series of recurring events, and/or a standard deviation determined for transaction amounts of a series of recurring events); and/or confidence scores that respectively indicate a confidence level that a set of entries is associated with a series of recurring events. Using the historical data and/or the additional information as inputs to the machine learning model, the document analysis device may determine a confidence score that an entry is associated with a recurring event and/or that a set of entries is associated with a series of recurring events. In this way, the document analysis device may train the machine learning model to identify a series of recurring events (e.g., that are associated with an account). The document analysis device may analyze the ledger associated with the account, using the trained machine learning model, to identify records associated with recurring events (e.g., as shown by reference number 108). For example, the document analysis device may analyze, using the machine learning model, a series of records included in the ledger to identify that at least one record included in the series of records is associated with a document and/or a series of recurring events based on information (e.g., metadata and/or transaction information) associated with the at least one record.

Figure 1B:
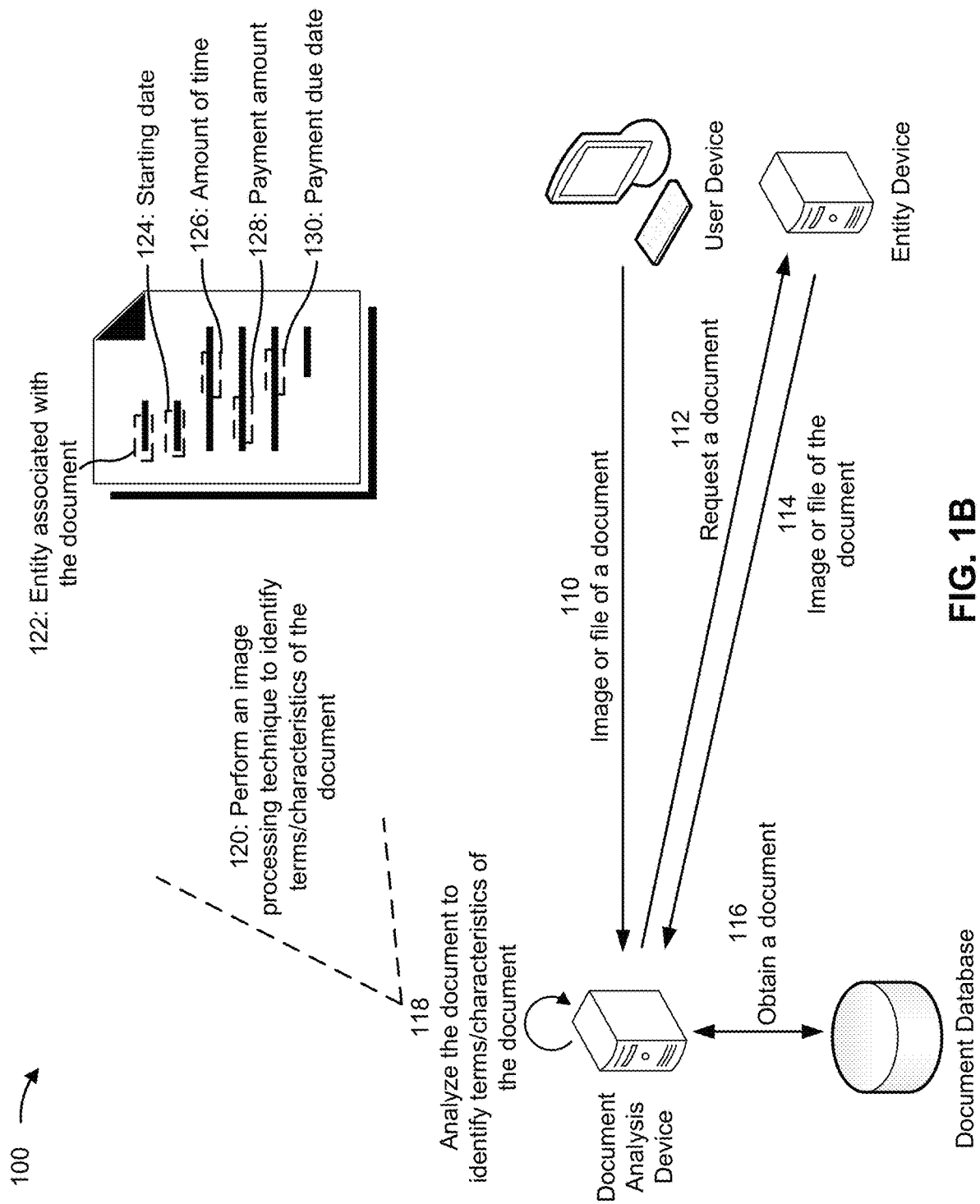

As shown in FIG. 1B, the document analysis device may obtain or receive one or more documents associated with the account (and/or records associated with the account). For example, as shown by reference number 110, the document analysis device may receive, from the user device, an image or file of a document (e.g., in a similar manner as described above in connection with reference number 104). For example, the document analysis device may identify a series of recurring events in a ledger associated with the account (e.g., as described above). The document analysis device may transmit, to the user device, a request for a document associated with the series of recurring events based on identifying the series of recurring events in the ledger. The user device may transmit, to the document analysis device, the image (e.g., image data) or the file associated with the document based on the request from the document analysis device.

As another example, as shown by reference number 112, the document analysis device may transmit, to the entity device, a request for a document. The entity device may be associated with the entity associated with series of recurring events. For example, as described in connection with FIG. 1A, the entity device may be associated with Entity A. The document analysis device may transmit the request for the document based on identifying the series of recurring events in the ledger associated with the account. In some implementations, the document analysis device may transmit an indication of a permission (e.g., provided by the user associated with the account) for the document analysis device to access the requested document. For example, as described elsewhere herein, the user device may provide a security key or another unique identifier to the document analysis device. The document analysis device may transmit, as part of the request, the security key or other unique identifier to the entity device (e.g., to indicate that the document analysis device has received permission to access the request document). In some implementations, the request may indicate the account and/or the user associated with the series of recurring events. In some implementations, the request may indicate identifiers of records (e.g., transaction identifiers) included in the series of recurring events. As shown by reference number 114, the entity device may transmit, and the document analysis device may receive, an indication of the requested document (e.g., via image data and/or a file as described elsewhere herein). For example, the entity device may identify the document associated with the series of recurring events based on the information provided in the request by the document analysis device.

In some implementations, as shown by reference number 116, the document analysis device may receive the indication of the document based on obtaining the document from a document database associated with the document analysis device. For example, the document analysis device may store one or more documents in the document database. In some implementations, a document may include standard terms and/or parameters (e.g., terms and/or parameters that are included in a majority, or all, versions of the document regardless of the user or account associated with the document). For example, a document for a first service associated with a first entity may include a standard term of a length of 1 year (e.g., all documents for the first service from the first entity are associated with an amount of time of 1 year, regardless of the user or account associated with the document). As another example, a document for a second service associated with a second entity may include a standard term of a payment amount of $100. Therefore, the document analysis device may store documents (and/or standard terms of documents associated with a service and/or entity) in the document database.

The document analysis device may search the document database for documents and/or standard terms of a document based on the identified series of recurring events. For example, the document analysis device may identify an entity associated with the series of recurring events. In some implementations, the document analysis device may identify a service associated with the series of recurring events (e.g., based on an amount associated with each record, a date associated with each record, and/or a periodicity (e.g., weekly, monthly, semi-annually, and/or annually) associated with the series of recurring events, among other examples). The document analysis device may search the document database for documents and/or standard terms of a document associated with the entity and/or the service. The document analysis device may obtain, from the document database, the document and/or the standard terms based on searching the document database.

In some implementations, the document analysis device may identify the document associated with a series of recurring events based on transaction information associated with at least one event (e.g., at least one record) included in the series of recurring events. For example, the document analysis device may identify the document based on an entity associated with the series of recurring events, an amount (e.g., a transaction amount) associated with the series of recurring events, a date (e.g., a transaction date) associated with the series of recurring events, and/or a periodicity associated with the series of recurring events, among other examples.

As shown by reference number 118, the document analysis device may identify one or more characteristics associated with the document. For example, the document analysis device may analyze the document to identify the one or more document characteristics. For example, as shown by reference number 120, the document analysis device may analyze the document using one or more text recognition techniques and/or image processing techniques. For example, the document analysis device may analyze the document using an OCR technique, an NLP technique, a computer vision technique, and/or another image processing or text recognition technique.

For example, in some implementations, the document analysis device may identify segments in image data of the document. For example, the document analysis device may use one or more computer vision techniques to identify edges depicted in the image data. The document analysis device may use the identified edges to identify the segments within the image data, e.g., each segment being defined by one or more edges forming a rectangular shape, as shown in FIG. 1B. In some implementations, the document analysis device may identify, from the segments identified in the image data, a segment of interest (e.g., a segment that includes, or is likely to include, text of interest, such as text of a particular type). For example, the document analysis device may identify segments of interest that include, or are likely to include, document characteristics, such as an entity associated with the document, an amount (e.g., a charge or a payment amount) associated with the series of recurring events, an amount of time associated with the series of recurring events, a remaining amount of time associated with the series of recurring events, a termination date associated with the series of recurring events, a payment due date associated with the series of recurring events, and/or one or more dates associated with a change in terms or available features or services provided under the document, among other examples. In some implementations, a computer vision model or an OCR model may be trained to recognize segments that include, or are likely to include, text of interest. For example, in some cases, a document includes a box or underlining in the document associated with text indicating a document characteristic. The document analysis device may use an OCR technique and/or an NLP technique to analyze the text in the segments of interest to identify the one or more document characteristics associated with the document.

For example, as shown by reference number 122, a first portion of the document may include text identifying the entity associated with the document. As shown by reference number 124, a second portion of the document may include text identifying a starting data associated with the document (or associated with a service provided under the document). As shown by reference number 126, a third portion of the document may include text identifying an amount of time associated with the document. As shown by reference number 128, a fourth portion of the document may include text identifying a payment amount associated with the document. As shown by reference number 130, a fifth portion of the document may include text identifying a payment due date associated with the document. Other portions of the document may include text identifying other document characteristics associated with the document. The document analysis device may use a computer vision technique, an OCR technique, and/or an NLP technique to identify the different portions and to identify and process the text included in the different portions. For example, the document analysis device may convert the text into a machine readable form to enable the document analysis device to understand and identify the document characteristics identified by the text.

Additionally, or alternatively, the document analysis device may receive, from the user device, the entity device, and/or another device, an indication of one or more document characteristics associated with the document. For example, a user may input one or more document characteristics associated with the document to the user device (e.g., via an application or web page managed by, or associated with, the document analysis device). The user device may transmit, and the document analysis device may receive, an indication of the one or more document characteristics input by the user. In some implementations, such as where the document analysis device identifies standard terms associated with the document, the document analysis device may transmit, to the user device, a request to confirm that the standard terms are accurate. For example, the document analysis device may transmit, to the user device, a request to indicate if any custom terms or parameters were added or modified in the specific document associated with the user. Additionally, or alternatively, the document analysis device may transmit, to the user device, a request to provide additional document characteristics that are not standard terms in the document (e.g., document characteristics that vary and/or that are not standard for all documents of that type). The user device may transmit, and the document analysis device may receive, an indication of one or more document characteristics (e.g., based on the request(s) transmitted by the document analysis device).

Additionally, or alternatively, the document characteristics may include other information associated with the document. For example, a document characteristic may include a penalty for breaking or breaching the terms of the document, one or more options for terminating the document (e.g., with or without penalties), an interest rate associated with the document, a late payment fee associated with the document, a grace period associated with the payment due date (e.g., an amount of time after the payment due date during which no penalties or late payment fee will be applied), and/or information indicating termination information for the document (e.g., information indicating if the document is terminated, converts to another document, or continues with the same terms or parameters, after the amount of time associated with the document), among other examples. Additionally, or alternatively, a document characteristic may include a date associated with the document.

For example, the date may include a starting date, a termination date, a date associated with a change in services provided (e.g., a date associated with the end of a trial period), a date associated with a feature or service becoming available (e.g., a date after which an upgrade to a different service or product is available), and/or a date associated with a change in the payment amount (e.g., a date associated with a termination of a free trial period and/or a date associated with an increase or decrease in the payment amount associated with the document), among other examples.

Figure 1C:
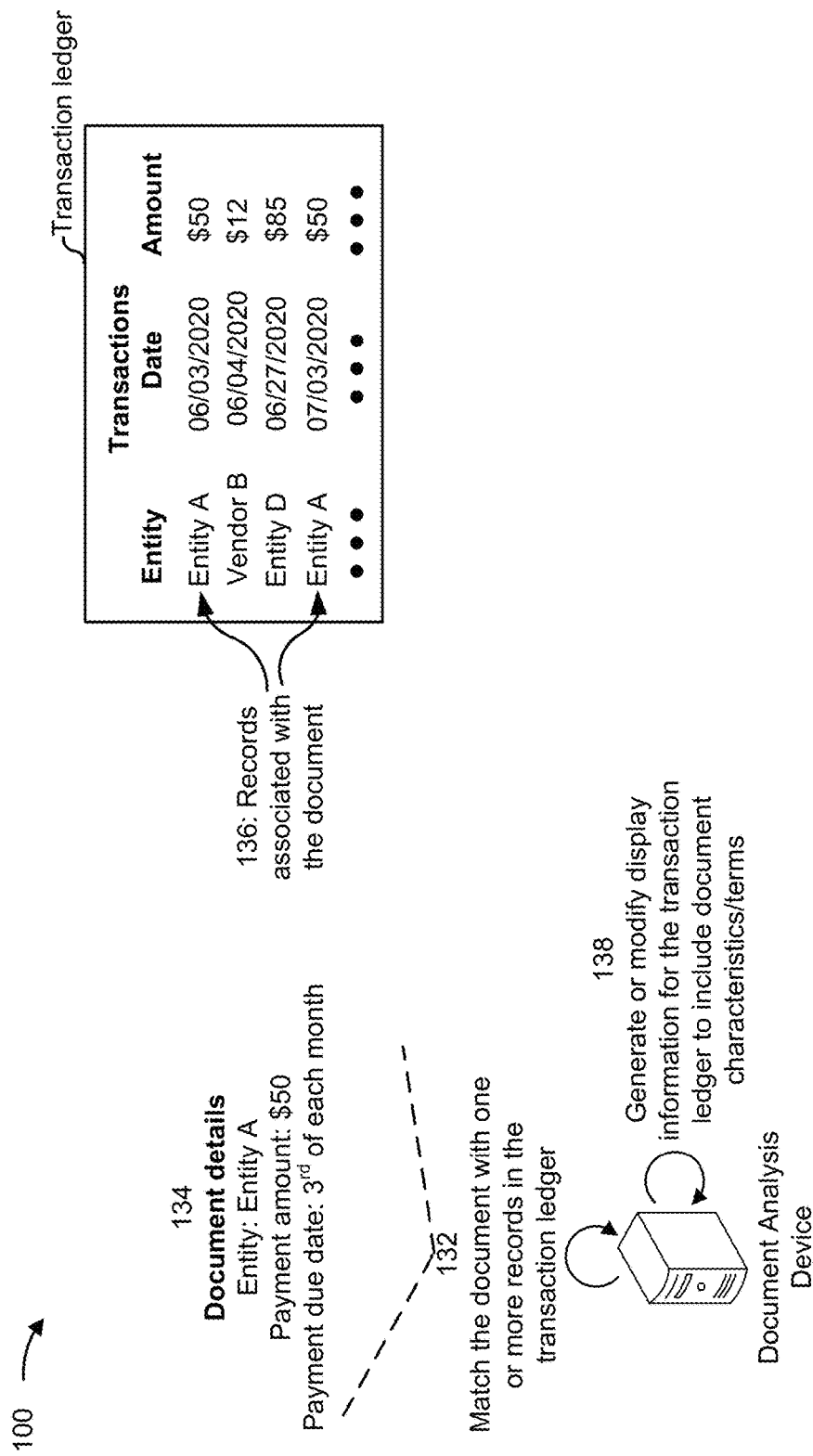

As shown in FIG. 1C, and by reference number 132, the document analysis device may match the document with a record included in a ledger (e.g., in a transaction log) associated with the account based on the document characteristics associated with the document and/or based on information associated with the record. For example, matching the record with the document may enable the document analysis device to identify that the record is associated with a recurring event of the series of recurring events (e.g., that is associated with the document).

For example, the document analysis device may identify information associated with the record. The information associated with the record may include metadata associated with the record. For example, the information associated with the record may include an entity associated with the record, an amount associated with the record, a date associated with the record, the account associated with the record, whether the record is associated with a series of recurring events, and/or a first record in time associated with the series of recurring events (e.g., indicating a start date of the series of recurring events), among other examples. The document analysis device may identify that the record, from a series of records included with the ledger, is associated with the document based on comparing the information associated with the record to the document characteristics associated with the document.

For example, the document analysis device may require a match between some document characteristics and information associated with the record to determine that the record is associated with the document, such as for the entity, among other examples (e.g., the entity associated with the record and the entity associated with the document may need to match exactly for the document analysis device to determine that the record is associated with the document). For other document characteristics, the document analysis device may use thresholds and/or confidence scores for determining if the record is associated with the document. For example, for a payment due date, the transaction date of the record may need to be within a threshold amount of time from the payment due date of the document (e.g., rather than matching exactly) for the document analysis device to determine that the record is associated with the document. Moreover, the document analysis device may determine whether a set of information associated with the record satisfy criteria (e.g., matching exactly or satisfying a threshold) for matching document characteristics. The document analysis device may determine whether the record is associated with the document holistically based on the set of information associated with the record (e.g., rather than making the determination solely based on one piece of the information associated with the record not satisfying a criterion for matching a document characteristic).

For example, as shown by reference number 134, the document may be associated with document characteristics that indicate that the document is associated with an entity of Entity A, a payment amount of $50, and/or a payment due date of the $3^{rd}$ of each month, among other examples. The document analysis device may parse or search the ledger (e.g., the transaction ledger) associated with the account using the document characteristics identified or received by the document analysis device. For example, as shown by reference number 136, the document analysis device may identify one or more records in the ledger associated with the document based on the document characteristic(s) and information associated with the one or more records.

For example, a first record in the ledger may be associated with Entity A (e.g., the same entity that is associated with the document), a transaction date of 06/03/2020 (e.g., on the $3^{rd}$ of the month, which is the payment due date, or is within a threshold amount of time from the payment due date, associated with the document), and a transaction amount of $50 (e.g., which is the payment amount associated with the document). A second record may be associated with Vendor B (e.g., a different entity than the entity that is associated with the document), a transaction date of 06/04/2020 (e.g., which is after the payment due date associated with the document), and a transaction amount of $12 (e.g., which is different than the payment amount associated with the document). A third record may be associated with Entity A (e.g., the same entity that is associated with the document), a transaction date of 07/03/2020 (e.g., on the $3^{rd}$ of the month, which is the payment due date, or is within a threshold amount of time from the payment due date, associated with the document), and a transaction amount of $50 (e.g., which is the payment amount associated with the document). Therefore, the document analysis device may determine that the first record and the third record are associated with the document (e.g., because information associated with the first record and the third record is similar to, or the same as, the document characteristics associated with the document). Additionally, the document analysis device may determine that the second record is not associated with the document because the information associated with the second record is not similar to, or is not the same as, the document characteristics associated with the document. The document analysis device may include an indication in the ledger, or in another database, that the first record and the third record are associated with the document.

The document analysis device may continue to match records with the document in a similar manner as new records are added to the ledger. For example, the document analysis device may identify a new record included in the ledger (e.g., that is added to the ledger after matching the document with a record in the ledger). The document analysis device may determine that the new record is associated with the document based on the one or more characteristics associated with the document and/or information associated with the new record. The document analysis device may include an indication in the ledger, or in another database, that the new record is associated with the document.

As shown by reference number 138, the document analysis device may generate display information for the ledger to include at least one document characteristic or document term. For example, the document analysis device may append information associated with the at least one document characteristic or document term to information associated with records that have been matched to the document. In some implementations, the document analysis device may modify display information associated with the ledger to append the at least one document characteristic or document term to information associated with records that have been matched to the document. For example, the document analysis device may modify the display information to append at least one characteristic associated with the document to information associated with the new record in the display information.

The display information may include an extensible markup language (XML) file, a document object model (DOM) structure, and/or code configured to cause the display information to be displayed when executed by a device (such as the user device), among other examples. In some implementations, the display information may include the document (e.g., an image of the document) or may include information indicating how to access the document. The display information may also be referred to as user interface information or graphical user interface (GUI) information.

Figure 1D:
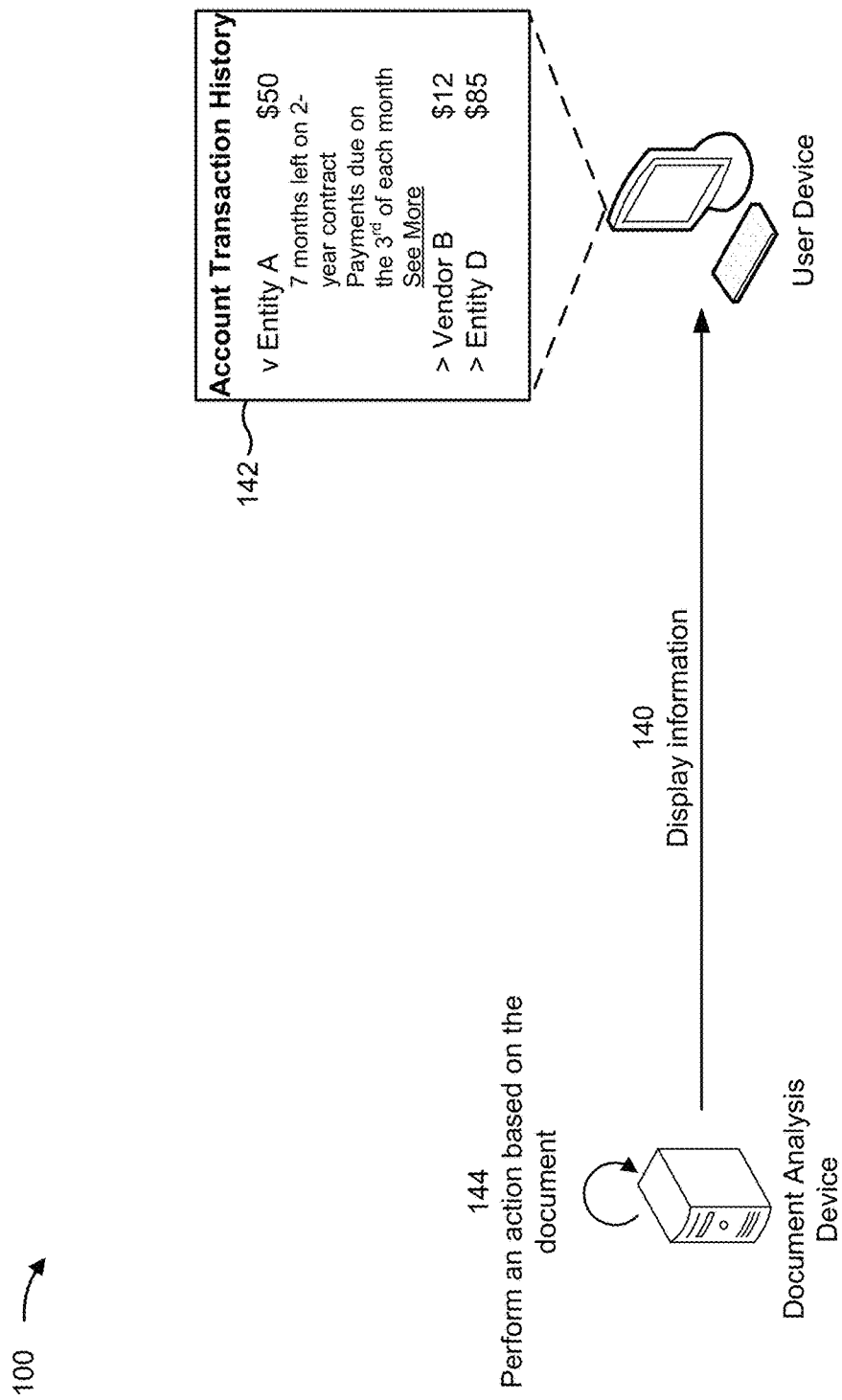

As shown in FIG. 1D, and by reference number 140, the document analysis device may transmit, and the user device may receive, the display information. Transmitting the display information may cause the display information to be displayed by the user device. For example, the user device may receive the display information and may display the display information via a user interface of the user device. In some implementations, the user device may display the display information via an application executing on the user device, or via a webpage, among other examples.

For example, as shown by reference number 142, the user device may display a ledger or transaction log associated with the account (e.g., may display an account transaction history webpage or application page). As shown in FIG. 1D, the user device may display information for one or more records (e.g., associated with a transaction linked with the account). The document analysis device may transmit the display information to cause the user device to display a series of records included in the ledger, where transmitting the display information causes the user device to display the at least one characteristic associated with the document in connection with the information associated with the record. For example, the user device may display information for a first record (e.g., associated with Entity A and an amount of $50), for a second record (e.g., associated with Vendor B and an amount of $12), and for a third record (e.g., associated with Entity D and an amount of $85). The first record may be associated with a document. For example, the first record may be associated with, or included in, a series of recurring events associated with the account.

As shown in FIG. 1D, the display information may cause one or more document characteristics associated with the document matched with the first record to be displayed in connection with the first record. For example, the user device may display an amount of time remaining associated with the document (e.g., 7 months), a total amount of time associated with the document (e.g., 2 years), and/or a payment due date (e.g., the $3^{rd}$ of each month). In some implementations, the document characteristics displayed may be based on a user preference or a user selection (e.g., indicated by the account registration). In some implementations, the document analysis device may cause document characteristics to be displayed such that contextual information is provided for a record. For example, multiple document characteristics may be combined into a single sentence, with additional information, to provide context to a record (e.g., "7 months left on 2-year contract," "3 months left until your payment increases to $60," or "you have 7 $50 payments remaining").

As shown in FIG. 1D, additional document characteristics may be accessed via the user device (e.g., via a user input to the "see more" option displayed by the user device). For example, the document analysis device may transmit information to cause additional, or all, document characteristics associated with the document to be displayed by the user device. In some implementations, the document analysis device may transmit, to the user device, information to cause the user device to display the document, or to display information indicating how to access the document (e.g., a hyperlink to a webpage where the document can be downloaded by the user device). In this way, the document characteristics associated with the record may be displayed in context with, or in connection with, the record. This improves access to the data associated with the document and enables an increased availability of context for a transaction or a record being displayed by the user device.

As shown by reference number 144, the document analysis device may perform one or more actions based on the document and/or a document characteristic. For example, the document characteristic may include a date, as described in more detail elsewhere herein. The document analysis device may detect a trigger event associated with the date. The trigger event may be associated with an occurrence of the date (e.g., a current date may be the date) and/or may associated with the current date being within a threshold amount of time from the date, among other examples. The document analysis device may transmit, to the user device, a notification indicating at least one of the document, the entity associated with the document, the date, or a purpose associated with the date. For example, the purpose of the date may be that a payment amount associated with the document increases on the date. In such examples, the notification may be "the payment associated with your Entity A contract (e.g., indicating the document and the entity) will increase by $10 (e.g., indicating the purpose associated with the date) on August 1 (e.g., indicating the date)."

In some implementations, the document analysis device may detect an upcoming event (e.g., an event that will occur on a date, as indicated by the document) associated with the series of recurring events based on the one or more characteristics. For example, the upcoming event may be an upcoming payment, a change in a service or product provided under the document, a change in a payment amount associated with the document, an end of a return window (e.g., an end of a window during which an item that was purchased can be returned), an expiration date of a warranty associated with the document, and/or another event or occurrence indicated by the document. The document analysis device may perform an action based on detecting the upcoming event. The action may include transmitting, to the user device, a notification associated with the upcoming event. In some implementations, the action may include updating a budget associated with the account based on an amount associated with the upcoming event. For example, an application or webpage associated with providing information associated with the account may provide a feature for setting a budget associated with the account. The document analysis device may automatically adjust the budget to account for the upcoming event associated with the document.

In some implementations, the action may include transferring resources (e.g., funds or credit) from another account associated with a user that is associated with the account to the account based on an amount associated with the upcoming event. For example, the user (e.g., in the account registration) may give the document analysis device permission to transfer resources from the other account (e.g., from a savings account) to the account. In some implementations, the document analysis device may transfer resources from the other account based on determining that the account does not include sufficient resources to complete the upcoming event. For example, if the upcoming event is an upcoming payment of $50 and the document analysis device determines that the account includes $40, then the document analysis device may automatically transfer at least $10 from the other account to the account. This may ensure that the upcoming event is not failed and/or may prevent an overdraft from the account. This conserves resources that would have otherwise been used to investigate, correct, and/or remedy a missed payment, a failed payment, and/or an overdraft on the account.

In some implementations, the action may include transmitting, to the user device, one or more recommended actions to be performed. For example, the document analysis device may transmit information to the user device to cause an indication of one or more recommended actions to be performed to be displayed by the user device. The one or more recommend actions may be a recommended budget change, a recommendation to transfer additional resources to an account, and/or a recommendation to investigate a document before a payment amount change, among other examples. The actions performed by the document analysis device may ensure that upcoming events or payments associated with the document are not missed by the user. Moreover, the actions may provide additional contextual information for the records and/or the documents associated with the records.

As indicated above, FIGS. 1A-1D are provided as an example. Other examples may differ from what is described with regard to FIGS. 1A-1D.

Figure 2:
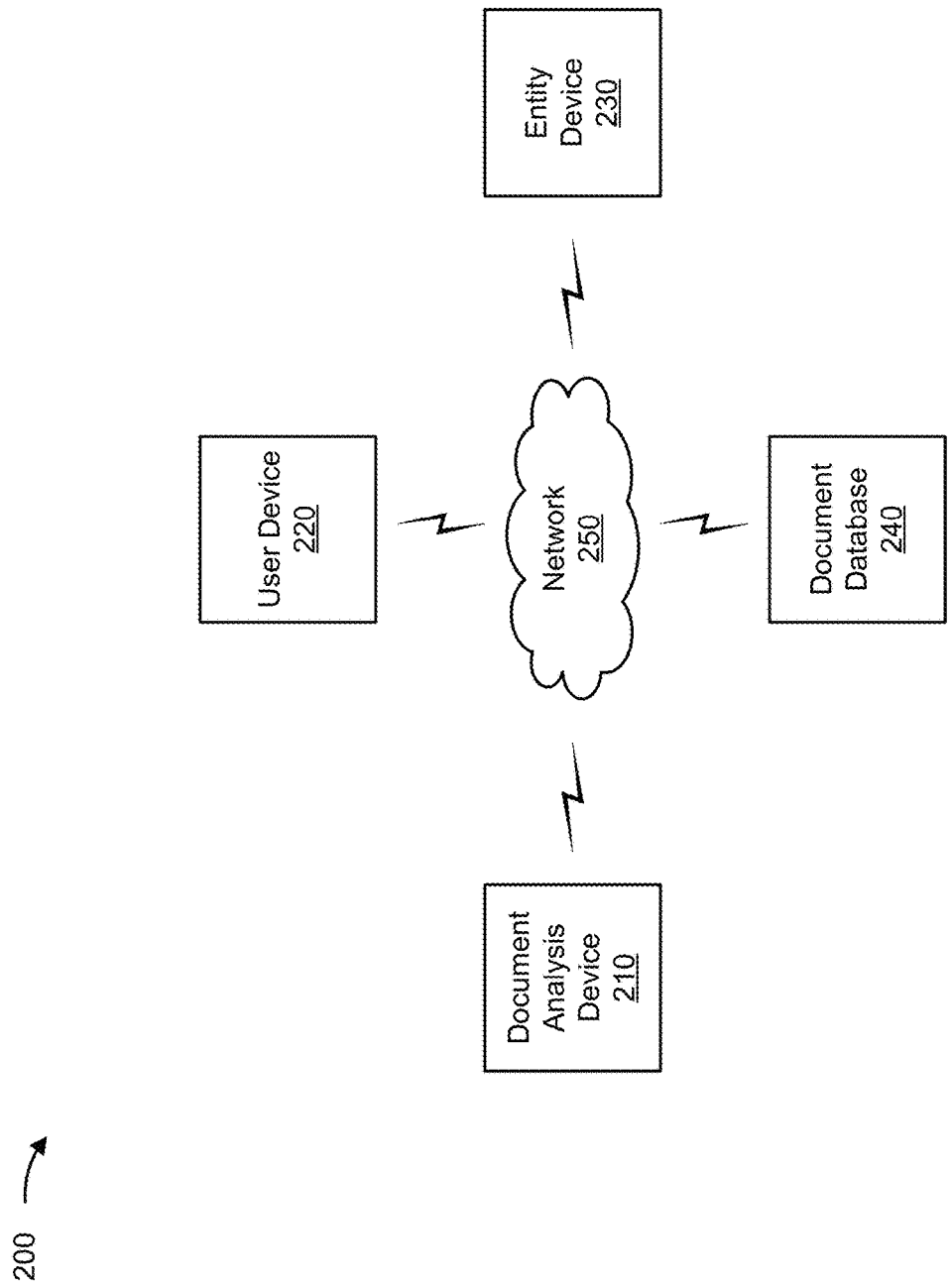
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a document analysis device 210, a user device 220, an entity device 230, a document database 240, and/or a network 250. Devices of environment 200 may interconnect via wired connections, wireless connections, or a combination of wired and wireless connections.

The document analysis device 210 includes one or more devices capable of receiving, generating, storing, processing, providing, and/or routing information associated with document analysis to identify document characteristics and appending the document characteristics to a record, as described elsewhere herein. The document analysis device 210 may include a communication device and/or a computing device. For example, the document analysis device 210 may include a server, such as an application server, a client server, a web server, a database server, a host server, a proxy server, a virtual server (e.g., executing on computing hardware), or a server in a cloud computing system. In some implementations, the document analysis device 210 includes computing hardware used in a cloud computing environment.

The user device 220 includes one or more devices capable of receiving, generating, storing, processing, and/or providing information associated with document analysis to identify document characteristics and appending the document characteristics to a record, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The entity device 230 includes one or more devices capable of receiving, generating, storing, processing, providing, and/or routing information associated with document analysis to identify document characteristics and appending the document characteristics to a record, as described elsewhere herein. The entity device 230 may include a communication device and/or a computing device. For example, the entity device 230 may include a server, such as an application server, a client server, a web server, a database server, a host server, a proxy server, a virtual server (e.g., executing on computing hardware), or a server in a cloud computing system. In some implementations, the entity device 230 includes computing hardware used in a cloud computing environment.

The document database 240 includes one or more devices capable of receiving, generating, storing, processing, and/or providing information associated with document analysis to identify document characteristics and appending the document characteristics to a record, as described elsewhere herein. The document database 240 may include a communication device and/or a computing device. For example, the document database 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The document database 240 may communicate with one or more other devices of environment 200, as described elsewhere herein.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
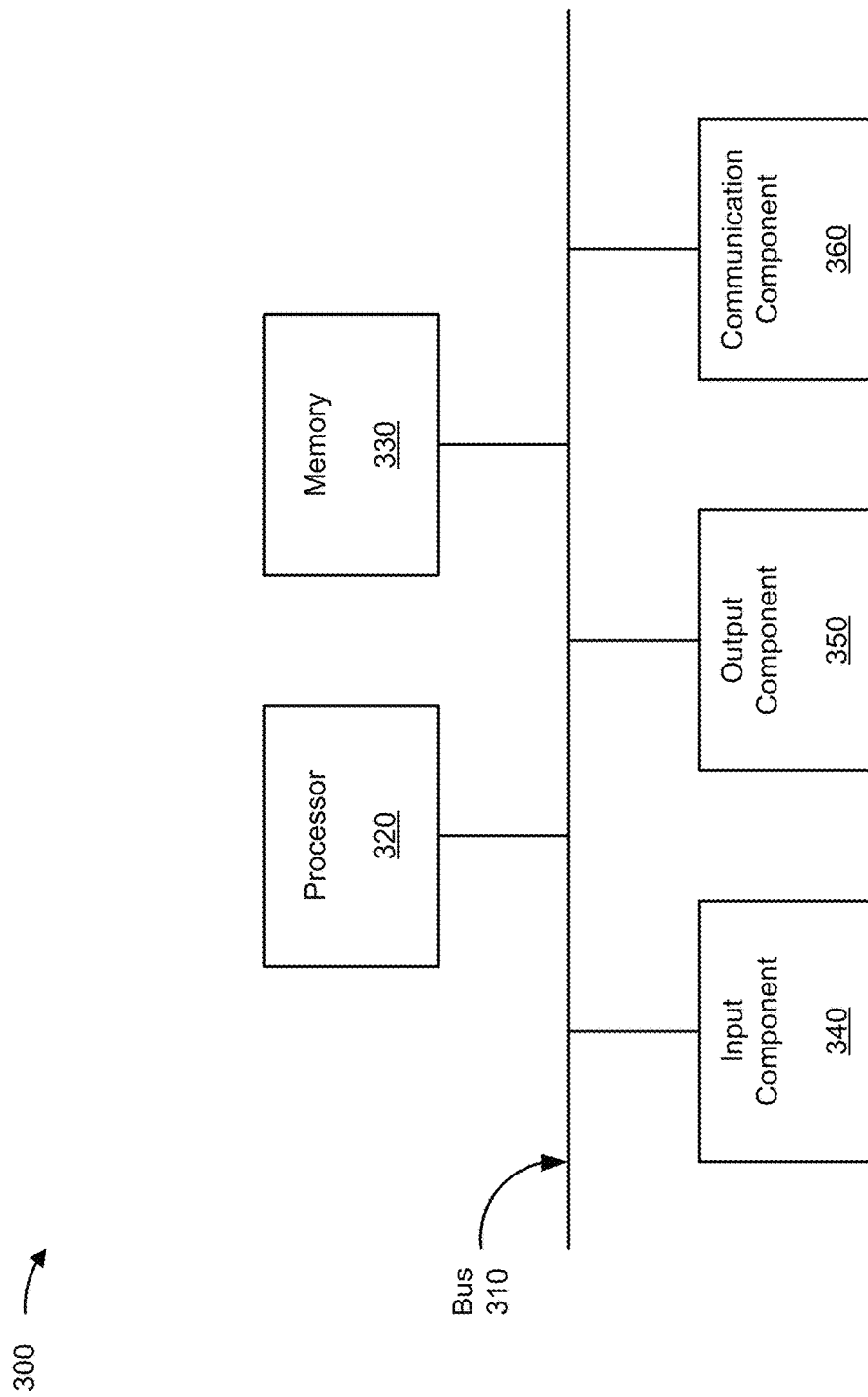
FIG. 3 is a diagram of example components of one or more devices of FIG. 2.

FIG. 3 is a diagram of example components of a device 300, which may correspond to the document analysis device 210, the user device 220, the entity device 230, and/or the document database 240. In some implementations, the document analysis device 210, the user device 220, the entity device 230, and/or the document database 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with document analysis to identify document characteristics and appending the document characteristics to a record. In some implementations, one or more process blocks of FIG. 4 may be performed by a device (e.g., document analysis device 210). In some implementations, one or more process blocks of FIG. 4 may be performed by another device or a group of devices separate from or including the device, such as the user device 220, the entity device 230, and/or the document database 240 Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an indication of a contract associated with a series of recurring events (block 410). In some implementations, the contract is associated with an account. As further shown in FIG. 4, process 400 may include identifying one or more characteristics associated with the contract (block 420). In some implementations, the one or more characteristics include at least one of an entity associated with the contract or an amount associated with the series of recurring events. As further shown in FIG. 4, process 400 may include matching the contract with a record included in a ledger associated with the account based on the one or more characteristics associated with the contract (block 430). In some implementations, matching the contract with the record enables the device to identify that the record is associated with a recurring event of the series of recurring events. As further shown in FIG. 4, process 400 may include appending at least one characteristic, of the one or more characteristics, associated with the contract to information associated with the record in display information associated with the ledger (block 440). As further shown in FIG. 4, process 400 may include providing, to a user device, the display information to cause the display information to be displayed by the device (block 450). In some implementations, the display information includes the information associated with the record linked with the at least one characteristic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for document analysis to identify document characteristics, the system comprising:
   one or more memories; and
   one or more processors, coupled to the one or more memories, configured to:
   receive an account registration associated with an account associated with a user;
   receive, based on receiving the account registration, a document associated with a series of recurring events, wherein the document is further associated with the account;
   analyze, using at least one of an optical character recognition technique or a natural language processing technique, the document to identify one or more characteristics associated with the document, wherein the one or more characteristics include at least one of an entity associated with the document or an amount associated with the series of recurring events;
   match the document with a record included in a ledger associated with the account based on the one or more characteristics associated with the document, wherein matching the document with the record enables the system to identify that the record is associated with a recurring event of the series of recurring events;

modify display information associated with the ledger based on matching the document with the record, wherein modifying the display information includes appending at least one characteristic, of the one or more characteristics, associated with the document to information associated with the record in the display information; and transmit, to a device, the display information to cause the display information to be displayed by the device.

2. The system of claim 1, wherein the one or more processors are further configured to:
identify a new record included in the ledger, wherein the new record is added to the ledger after matching the document with the record;
determine that the new record is associated with the document based on the one or more characteristics associated with the document; and
modify the display information to append at least one characteristic, of the one or more characteristics, associated with the document to information associated with the new record in the display information.

3. The system of claim 1, wherein the one or more processors, to receive the document, are configured to:
receive an image of the document or a file associated with the document.

4. The system of claim 1, wherein the one or more processors, to receive the document, are configured to:
analyze one or more records included in the ledger to identify that at least one record of the one or more records is associated with the series of recurring events, wherein identifying that the at least one record is associated with the series of recurring events is based on an amount indicated by the at least one record or that the at least one record is associated with the entity;
transmit a request for the document associated with the series of recurring events based on analyzing the one or more records included in the ledger; and
receive the document associated with the series of recurring events based on transmitting the request.

5. The system of claim 1, wherein the one or more processors, to analyze the document, are configured to:
identify the one or more characteristics associated with the document, wherein the one or more characteristics further include at least one of:
an amount of time associated with the series of recurring events,
a remaining amount of time associated with the series of recurring events,
a termination date associated with the series of recurring events,
a payment due date associated with the series of recurring events, or
one or more dates associated with a change in terms or available features of the document.

6. The system of claim 1, wherein the one or more processors, to match the document with the record, are configured to:
identify information associated with the record, wherein the information includes at least one of an entity associated with the record, an amount associated with the record, or a date associated with the record; and
identify that the record, from a series of records included with the ledger, is associated with the document based on comparing the information associated with the record to the one or more characteristics associated with the document.

7. The system of claim 1, wherein the one or more processors, to transmit the display information, are configured to:
transmit the display information to cause the device to display a series of records included in the ledger, wherein transmitting the display information causes the device to display the at least one characteristic associated with the document in connection with the information associated with the record.

8. The system of claim 1, where the one or more characteristics include one or more dates associated with the document, and wherein the one or more processors are further configured to:
detect a trigger event associated with a date of the one or more dates, wherein the trigger event is associated with an occurrence of the date or is associated with a current date being within a threshold amount of time from the date; and
transmit, to a device associated the account, a notification indicating at least one of the document, the entity associated with the document, the date, or a purpose associated with the date.

9. A method of document analysis to identify document characteristics, comprising:
receiving, by a device, an account registration associated with an account associated with a user;
receiving, by the device and based on receiving the account registration, an indication of a contract associated with a series of recurring events, wherein the contract is further associated with the account;
identifying, by the device, one or more characteristics associated with the contract, wherein the one or more characteristics include at least one of an entity associated with the contract or an amount associated with the series of recurring events;
matching, by the device, the contract with a record included in a ledger associated with the account based on the one or more characteristics associated with the contract, wherein matching the contract with the record enables the device to identify that the record is associated with a recurring event of the series of recurring events;
appending, by the device, at least one characteristic, of the one or more characteristics, associated with the contract to information associated with the record in display information associated with the ledger; and
providing, by the device and to a user device, the display information to cause the display information to be displayed by the device, wherein the display information includes the information associated with the record linked with the at least one characteristic.

10. The method of claim 9, further comprising:
identifying one or more recurring events included in the ledger based on information associated with a series of records included in the ledger; and
determining that records, included in the ledger, associated with the one or more recurring events are associated with the contract based on identifying the one or more recurring events, wherein the records associated with the one or more recurring events include the record, and wherein receiving the indication of the contract is based on determining that the records associated with the one or more recurring events are associated with the contract.

11. The method of claim 9, further comprising:
analyzing, using a machine learning technique, a series of records included in the ledger to identify that at least one record included in the series of records is associated with the contract based on transaction information associated with the at least one record, wherein receiving the indication of the contract is based on analyzing the series of records to identify that the at least one record included in the series of records is associated with the contract.

12. The method of claim 9, wherein receiving the indication of the contract comprises:
identifying the contract based on transaction information associated with at least one record included in the ledger; and
identifying at least one characteristic of the one or more characteristics associated with the contract based on one or more standard terms associated with the contract.

13. The method of claim 9, wherein identifying the one or more characteristics associated with the contract comprises:
analyzing, using at least one of an optical character recognition technique or a natural language processing technique, the contract to identify the one or more characteristics.

14. The method of claim 9, further comprising:
detecting an upcoming event associated with the series of recurring events based on the one or more characteristics; and
performing an action based on detecting the upcoming event, wherein the action includes at least one of:
transmitting, to a device associated with the account, a notification associated with the upcoming event;
updating a budget associated with the account based on an amount associated with the upcoming event;
transferring resources, from another account associated with the user that is associated with the account, to the account based on an amount associated with the upcoming event; or
transmitting, to the device associated with the account, one or more recommended actions to be performed.

15. The method of claim 9, where the one or more characteristics include one or more dates associated with the contract, the method further comprising:
detecting a trigger event associated with a date of the one or more dates, wherein the trigger event is associated with an occurrence of the date or is associated with a current date being within a threshold amount of time from the date; and
transmitting, to a device associated the account, a notification indicating at least one of the contract, the entity associated with the contract, the date, or a purpose associated with the date.

16. A non-transitory computer-readable medium storing a set of instructions, the set of instructions comprising:
one or more instructions that, when executed by one or more processors of a device, cause the device to:
receive an account registration associated with an account associated with a user;
receive, based on receiving the account registration, a document associated with a series of recurring events, wherein the document is further associated with the account;
analyze, using a text recognition technique, the document to identify one or more terms associated with the document, wherein the one or more terms include at least one of an entity associated with the document or an amount associated with the series of recurring events;
match the document with a record included in a ledger associated with the account based on the one or more terms associated with the document, wherein matching the document with the record enables the device to identify that the record is associated with a recurring event of the series of recurring events;
modify display information associated with the ledger based on matching the document with the record, wherein modifying the display information includes appending at least one term, of the one or more terms, associated with the document to information associated with the record in the display information; and
transmit, to a user device, the display information to cause the display information to be displayed by the user device.

17. The non-transitory computer-readable medium of claim 16, wherein the one or more instructions further cause the device to:
identify a new record included in the ledger, wherein the new record is added to the ledger after matching the document with the record;
determine that the new record is associated with the document based on the one or more terms associated with the document; and
modify the display information to append at least one term, of the one or more terms, associated with the document to information associated with the new record in the display information.

18. The non-transitory computer-readable medium of claim 16, wherein the one or more instructions further cause the device to:
identify the one or more terms associated with the document, wherein the one or more terms further include at least one of:
an amount of time associated with the series of recurring events,
a remaining amount of time associated with the series of recurring events,
a termination date associated with the series of recurring events,
a payment due date associated with the series of recurring events, or
one or more dates associated with a change in terms or available features of the document.

19. The non-transitory computer-readable medium of claim 16, wherein the one or more instructions further cause the device to:
identify information associated with the record, wherein the information includes at least one of an entity associated with the record, an amount associated with the record, or a date associated with the record; and
identify that the record, from a series of records included with the ledger, is associated with the document based on comparing the information associated with the record to the one or more terms associated with the document.

20. The non-transitory computer-readable medium of claim 16, where the one or more terms include one or more dates associated with the document, and wherein the one or more processors are further configured to:
detect a trigger event associated with a date of the one or more dates, wherein the trigger event is associated with an occurrence of the date or is associated with a current date being within a threshold amount of time from the date; and transmit, to the user device, a notification indicating at least one of the document, the entity associated with the document, the date, or a purpose associated with the date.

\* \* \* \* \*